United States Patent
Meisen

(10) Patent No.: US 6,806,010 B2
(45) Date of Patent: Oct. 19, 2004

(54) TONER CONTAINING MAGNETITE PARTICLES

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/940,954

(22) Filed: Aug. 28, 2001

(65) Prior Publication Data
US 2002/0119386 A1 Aug. 29, 2002

(30) Foreign Application Priority Data
Sep. 1, 2000 (DE) .......................... 100 43 492

(51) Int. Cl.$^7$ .............................................. G03G 9/107
(52) U.S. Cl. ................... 430/106.1; 430/106.2
(58) Field of Search .................. 430/106.1, 100.2, 430/111.41, 110.3

(56) References Cited

U.S. PATENT DOCUMENTS

| | | | |
|---|---|---|---|
| 802,928 A | 10/1905 | Fireman et al. | |
| 3,970,738 A | 7/1976 | Matsui et al. | 423/140 |
| 4,282,302 A | 8/1981 | Makino et al. | 430/107 |
| 4,753,680 A | 6/1988 | Burow et al. | 106/304 |
| 4,820,603 A | 4/1989 | Sakashita | 430/106.6 |
| 5,055,136 A | 10/1991 | Wiese et al. | 106/456 |
| 5,199,983 A | 4/1993 | Katamoto | 106/459 |
| 5,296,326 A | 3/1994 | Taya et al. | 430/106.6 |
| 5,578,375 A | 11/1996 | Okano et al. | 428/402 |
| 5,599,627 A * | 2/1997 | Aoki et al. | 430/106.2 |
| 5,759,435 A | 6/1998 | Miyazono et al. | 252/62.59 |
| 5,885,740 A * | 3/1999 | Tokunaga et al. | 430/106.2 |
| 6,383,637 B1 | 5/2002 | Misawa et al. | 428/403 |
| 6,416,917 B1 * | 7/2002 | Nakanishi et al. | 430/110.3 |

FOREIGN PATENT DOCUMENTS

| | | | |
|---|---|---|---|
| DE | 32 09 469 | 9/1982 | |
| DE | 216 040 | 11/1984 | |
| DE | 284 478 | 11/1990 | |
| DE | 197 02 431 | 7/1998 | |
| DE | 197 02 431 | 1/2000 | |
| EP | 826 635 | 3/1998 | |
| GB | 1535889 | 12/1978 | |
| GB | 2040904 | 9/1990 | |
| JP | 51-44298 | 4/1976 | |
| JP | 61-34070 | 2/1986 | |
| JP | 07240306 A * | 9/1995 | H01F/1/00 |

OTHER PUBLICATIONS

Diamond, Arthur S. (editor) Handbook of Imaging Materials. New York: Marcel–Dekker, Inc. (1991) pp. 162–170.*

* cited by examiner

Primary Examiner—Christopher Rodee
(74) Attorney, Agent, or Firm—Godfried R. Akorli; Diderico van Eyl

(57) ABSTRACT

The invention relates to a toner containing low-silicon magnetite particles.

1 Claim, No Drawings

TONER CONTAINING MAGNETITE PARTICLES

BACKGROUND OF THE INVENTION

The invention relates to a toner containing magnetite particles.

Particulate magnetites that can be produced from aqueous solutions by a precipitation process have been known for a long time. U.S. Pat. No. 802,928 already describes the production of magnetite by precipitating iron(II) sulfate with an alkaline component and subsequent oxidation with air. Numerous, further subsequent documents likewise describe the production of magnetites by the precipitation process.

Pure precipitation magnetites without traces of other metals or elements can be produced batchwise according to DE-A 3,209,469 or continuously according to DE-A 2,618,058.

Normally, $FeSO_4$ is used as iron(II) salt. It is, however, also possible to use any soluble iron(II) salt to produce a magnetite by the precipitation process. In particular, $FeCl_2$ is suitable as described in DE-A 3,004,718. $FeSO_4$ or $FeCL_2$ have the advantage that both substances can be obtained in large quantities very inexpensively as waste materials from the iron-processing industry.

In addition to the most frequently used sodium hydroxide, CaO or $CaCO_3$ (DE-A 3,004,718), ammonia (DE-A 2,460,493) or $Na_2CO_3$, $MgCO_3$ or MgO (EP-A 0,187,331) are also suitable as precipitating agent. Usually, air is used as oxidizing agent. However, processes for oxidation with nitrates (DD-A 216,040 and DD-A 284,478) are also described.

Magnetites were first used to produce all kinds of paints. The particular advantage of magnetites over organic dyestuffs and soot is their much better weather resistance. Paints containing magnetite can also to be used outdoors.

Furthermore, precipitation magnetites are favored for use in coloring concrete moldings, such as, for example, concrete paving stones or concrete roof tiles.

Magnetites have also been used for some time in electrophotography for producing toners. Magnetites that have been produced by the precipitation process are preferably used to produce toners for copying machines using single-component toners. The magnetic toners used for this purpose must have various properties. With the progressive development and improvement of copying machines and printers, the requirements relating to magnetic toners and, consequently, to the magnetite used for this purpose have become increasingly greater. The latest printer generation achieves a resolution of more than 400 dpi (dots per inch), for which purpose it was necessary to develop finely divided toners having very narrow particle size distribution. This had the result that the magnetites used for this purpose likewise have to have very narrow particle size distribution. Furthermore, a certain particle size is necessary to ensure a homogeneous distribution of the magnetite particles in the finished toner. The magnetites themselves must have a sufficiently high electrical resistance to stabilize the latent image during the electrostatic transfer. Furthermore, coercive force, saturation magnetization and, in particular, the remnant magnetization must be in the correct relationship to the field strengths prevailing in the machine.

Si-containing magnetites are used for the application in magnetic toners. These have a different charge behavior to that of pure magnetites and have a higher thermal stability for the same particle size. A process for producing such particles is described in JP-A-61 034 070. In this case, the Si component is added to the iron(II) sulfate, but this results in precipitations of silicic acid and, consequently, in non-uniform distribution of silicon in the magnetite lattice. The production of magnetites by the precipitation process using silicon is also described in JP-A-51 044 298. U.S. Pat. No. 4,992,191 describes a magnetite containing 0.1 to 5.0 atomic % of Si relative to Fe that is claimed to be particularly suitable for producing toners. In the process described therein, a silicate component is added to an alkaline component in the form of an aqueous solution and then an iron(II) component in the form of an aqueous solution in an amount that is such that the molar ratio of Fe(II) component to alkaline component is roughly $$0.53\left[\frac{1.5}{2.85}\right],$$

the temperature being kept at 90° C. The suspension obtained in this way is then treated with air as oxidizing agent in order to obtain spheroidal, silicon-containing magnetite having a particle size in the range from 0.1 to 1.0 µm. The particles obtained are filtered, washed and ground.

DE-A 19 702 431 describes a further process for producing particularly round Si-containing magnetites. In the latter, the production of low-silicon, almost Si-free, round magnetites is also described in detail for the first time. The thermal stability of said magnetites is, however, described as inadequate for the production of magnetic toners, with the result that, according to this teaching, the presence of silicon was regarded as necessary to produce magnetites suitable for producing toners.

An object of the present invention was to provide a particularly inexpensive process for producing magnetites having properties suitable for the production of magnetic toners and also the toners producible with said magnetites.

Surprisingly, it was found that the magnetites, described in DE-A 19 702 431 as insufficiently thermally stable, can be used very satisfactorily in toners. In addition, the production process is less expensive as the result of the elimination of the Si-introducing component, which also makes one process step unnecessary.

SUMMARY OF THE INVENTION

The invention relates to a toner containing low-silicon magnetites.

DETAILED DESCRIPTION OF THE INVENTION

Low Si in the context of the invention are magnetites having an Si content of less than 0.025 wt %, preferably less than 0.0025 wt %, particularly preferably less than 0.001 wt %.

The magnetites that can be used according to the invention are obtained by a process in which a) an alkaline component is taken in the form of an aqueous solution under protective gas, b) the alkaline component is heated to a temperature of 50 to 100° C., preferably 60 to 90° C., c) an iron(II) component in the form of an aqueous solution is added in an amount such that there is a molar ratio of Fe(II) component to one equivalent of alkaline component of 0.48 to 0.6, the temperature being kept at 50 to 100° C., preferably 60 to 90° C., d) the suspension obtained in c) is treated with an oxidizing agent until the Fe(III) content in the iron compound is more than 65 mol %, e) after oxidation as in d), an alkaline component in the form of an aqueous solution is again added under protective gas to the suspension obtained in d) in an amount such that a theoretical molar ratio of Fe(II) used under c) to one equivalent of alkaline component used in total is obtained of 0.40 to 0.48, preferably 0.45 to 0.47, f) said suspension is heated to 50 to 100° C., preferably 60 to 90° C., g) an Fe(II) component in the form of an aqueous solution is added in an amount such that a molar ratio of Fe(II) component to one equivalent of alkaline component is obtained of 0.48 to 0.60, h) oxidation is carried out with an oxidizing agent up to an Fe(II) content in the iron compound of more than 65 mol % relative to the iron content, and then i) filtration is carried out and the residue is washed, dried and ground.

The particle size and particle shape of the magnetites can be controlled by the precipitation pH. If the magnetites are precipitated in the Fe(III)/NaOH ratio range of more than 0.48, increasingly round particles are obtained that are notable for very low remanence. Furthermore, these particles are generally relatively finely divided compared with magnetites produced at other pHs.

Adding sodium hydroxide solution after completing the first oxidation, further adding iron in the form of a water-soluble iron(II) salt and reoxidation makes it possible to coarsen these finely divided magnetites. This improves the thermal stability. A further improvement in the thermal stability can be achieved by aftertreatment with organic or inorganic substances. In this connection, inorganic Al, Si, Ti, Mg or Zr compounds that form dense hydroxide or oxyhydroxide layers during the precipitation are preferably used. Particularly preferred, however, is the addition of organic aftertreatment agents, such as polysiloxanes or Ti esters.

An alkali-metal hydroxide, an alkaline-earth-metal hydroxide, an alkaline-earth-metal oxide, an alkali-metal carbonate, $MgCO_3$ or ammonia can preferably be used as alkaline component. A water-soluble alkali-metal silicate is preferably used as silicate component. A water-soluble Fe(II) salt, particularly preferably iron sulfate or iron dichloride, is preferably used as iron(II) component. It is also possible, however, to use other water-soluble Fe(II) compounds, in particular, if they are available at comparable prices. Atmospheric oxygen, pure oxygen, $H_2O_2$, chlorine, alkali-metal chlorates (for example, NaOCl, $NaClO_3$, $NaClO_4$) or nitrates can preferably be used as oxidizing agents. For economic reasons, atmospheric oxygen, pure oxygen, $H_2O_2$ or sodium nitrate are particularly preferably used.

A particularly preferred embodiment of the process according to the invention will be described in greater detail below:

Sodium hydroxide solution containing 300 g of NaOH per liter of water is introduced into a batchwise stirred vessel while stirring and passing protective gas through.

The solution is then heated to a temperature of between 50 and 100° C., preferably between 60 and 90° C. Once this temperature is reached, the metered addition of the Fe(II) component is started. The Fe(II) component is calculated on the basis of the desired NaOH/Fe(II) ratio. If, for example, an NaOH/Fe(II) ratio of 0.55 is desired and 100 mol of NaOH is taken, 100*0.55=55 mol of Fe(II) component must be added. The calculation of the alkali-metal hydroxide/Fe (II) ratio is based on the equation

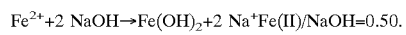
$Fe^{2+}+2\ NaOH \rightarrow Fe(OH)_2+2\ Na^+ Fe(II)/NaOH=0.50.$

If an alkaline component is used that reacts in another stoichiometric ratio with the Fe(II) component to form $Fe(OH)_2$ or $FeCO_3$, the ratio must be altered accordingly. This case occurs, for example, if carbonates or alkaline-earth-metal hydroxides or oxides are used, resulting in such cases in the following equation:

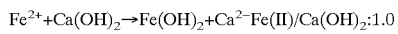
$Fe^{2+}+Ca(OH)_2 \rightarrow Fe(OH)_2+Ca^{2-} Fe(II)/Ca(OH)_2:1.0$ or

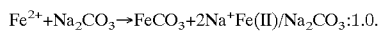
$Fe^{2+}+Na_2CO_3 \rightarrow FeCO_3+2Na^+ Fe(II)/Na_2CO_3:1.0.$

The metered addition of the Fe(II) component preferably takes place at such a rate that no drop in temperature occurs. After the addition of the calculated amount of the Fe(II) component is complete, the mixture is optionally heated again to 50 to 100° C. In many cases, the temperature in b) and the temperature in c) are identical, with the result that a reheating in c) is unnecessary. Once the temperature is reached, the gasification with protective gas is terminated and addition of the oxidizing agent is started. In the case of an air gasification, air is passed via a gasification device below the stirrer. The amount of air applied per hour is between 0.5 and 15 l/h per mol of Fe(II). If $NaNO_3$ is used, the oxidizing agent is applied by pumping as an aqueous solution within 5 to 30 minutes. The amount required in this connection is calculated according to:

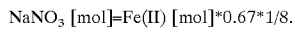
$NaNO_3\ [mol]=Fe(II)\ [mol]*0.67*1/8.$

Accordingly, 8.375 mol of $NaNO_3$ is necessary for 100 mol of Fe(II). The other oxidizing agents are calculated on the redox equivalence of the respective oxidizing agents. Care has to be taken that only a maximum of 66.6% of the Fe(II) must be oxidized to produce magnetite.

The oxidation is preferably terminated when an Fe(III) content of more than 65 mol % is reached. This can be determined by redox titration.

Following this first run (steps a) to d)), these steps are carried out once more. An alkaline component is added while stirring and passing protective gas through the suspension from d). The necessary amount of alkaline component is calculated as specified above from the required Fe(II)/NaOH ratio. The Fe(II) component is then added in an amount corresponding to the desired Fe(II)/NaOH ratio. After adding this amount of Fe(II) component, the passage of protective gas is switched off and the oxidation is restarted.

After conclusion of the second oxidation, the product is filtered, washed and dried. Before drying, the product can be aftertreated to improve the thermal stability and the dispersability. A polysiloxane or organic Ti ester is preferably used for this purpose.

The magnetites produced by the process according to the invention or the magnetites according to the invention can be used particularly advantageously to produce toners, but also to produce printing inks or ink pastes for ink-jet printers.

These low-silicon magnetites can be used not only in magnetic toners, but also for coloring paper, plastic, lacquers, fibers and concrete and can be used in paints.

The properties of the magnetites are measured by the following methods:

1. The color values are tested by preparing a lacquer: 3.2 g of magnetite are ground in a Micro-Dismembrator (30") having an agate 10 mm diameter ball. Then 2.0 g of the binder Alkydal F48 (produced by Bayer AG), 0.1 g of the ground magnetite to be tested and 1.0 g of $TiO_2$ (Bayertitan R-FK2; produced by Bayer AG) are pasted on a disc-type paint dispersion machine made by the Engelsmann company having a diameter of 250 mm (also referred to as Muller). The color values L* (brightness), a* (red tinge) and b* (blue tinge) are determined according to DIN 55 986 using Dataflash 2000 (d/8°), apparatus A and the evaluation program CIELAB 2 as of 19.10.1989. The entire color measurement procedure is described in detail in EP-A 0 911 370.

2. The magnetic values (coercive force, specific saturation magnetization, specific remnant magnetization) are measured using a magnetometer made by the company Bayer (at a field strength of 5000 oersted (equivalent to 397.9 $A \cdot m^{-1}$)).

3. The BET surface area is measured according to DIN 66131:

Gas mixture: 90% He, 10% $N_2$; measurement temperature: 77.4 K;
   Baking at 140° C., 60 minutes.

4. Elemental analysis for Si and Mn: Si is determined spectroanalytically by ICP-OES. Mn is determined by atomic absorption spectroscopy.

5. Elemental analysis for Fe (total), Fe(II) and Fe(III):

Determinations according to DIN 55913: the Fe(II) content is determined by titrating with $KMnO_4$ using a Memotitrator (Mettler DL-70). Fe(III) is analogously determined with $TiCl_3$. The total iron content is calculated from the two individual values and the initial sample mass. The contents of the two standard solutions are determined daily.

6. Particle shape and particle size:

Estimation of particle size and shape from a transmission electron micrograph (TEM) at a magnification of 30,000 times.

7. Elemental analysis for S:

Sulfur is determined by ICP-OES.

8. The sphericity is determined by means of image analysis based on a TEM micrograph at a magnification of 30,000 times. The evaluation is done by the shape factor method using an automatic image analysis system (IBAS, made by Zeiss). In this connection, the ratio of minimum diameter to maximum diameter of a particle gives the shape factor. The nearer this value is to 1.0, the rounder is the particle.

9. The water-soluble components are determined according to ISO EN 787 Part 3.

10. The pH of the magnetite powder is determined according to ISO EN 787 Part 9.

The invention will be explained in greater detail by reference to the following examples.

Examples

Example 1

6000 g of sodium hydroxide solution containing 300 g/l, equivalent to 45 mol, of NaOH, were introduced into a stirred vessel having a capacity of 30 liters. After switching on the nitrogen gasification and the stirrer, the sodium hydroxide solution was heated to 90° C. 13.756 liters of iron(II) sulfate solution having a content of 260.89 g/l, equivalent to 23.625 mol of Fe(II) were now fed in by pumping in the course of 51 minutes. The $FeSO_4/NaOH$ ratio was 0.525. The nitrogen gasification was then switched off and gasification was carried out with 86 l/h of air via a gasification ring mounted underneath the stirrer. The gasification was terminated when an Fe(III) content of 66 mol % had been reached. Gasification with nitrogen was then repeated. Then 850 ml of sodium hydroxide solution containing 300 g of NaOH/l, equivalent to 6.375 mol of NaOH, were fed in by pumping in the course of 4 minutes. At this point in time, the $FeSO_4/NaOH$ ratio was 0.46. Then 1100 ml of $FeSO_4$ solution having a content of 260.89 g/l was fed in by pumping in the course of 5 minutes. This amount of $FeSO_4$ is equivalent to 1.889 mol of $FeSO_4$. The $FeSO_4$ ratio at this point in time was 0.497. Then oxidation was carried out with 86 l/h up to an Fe(III) content of 66.8 mol %.

After completion of the oxidation, the suspension was filtered, washed thoroughly with fully demineralized water and dried at 80° C. in air. The powder obtained was ground in an impact crusher.

The magnetite obtained had the following properties:

| | |
|---|---|
| Brightness L* | 51.2 CIELAB |
| a* | 0.3 CIELAB |
| b* | −4.8 CIELAB |
| Sphericity | 0.92 |
| Si content | 0.001 wt % |
| Coercive force | 52 oersted = 4.138 kA/m |
| Particle size | 0.2 μm |
| S content | 0.78 wt %, determined as $SO_3$ |
| Mn content | 0.11 wt % |
| Water-soluble components | 0.13 wt % |
| DIN pH value | 6.2 |
| Thermal stability | 120° C. |

Example 2

6000 g of sodium hydroxide solution containing 300 g/l, equivalent to 45 mol, of NaOH, were introduced into a stirred vessel having a capacity of 30 liters. After switching on the nitrogen gasification and the stirrer, the sodium hydroxide solution was heated to 90° C. 13.664 l of iron(II) sulfate solution having a content of 250.13 g/l, equivalent to 22.50 mol of Fe(II), were now fed in by pumping in the course of 43 minutes. The $FeSO_4/NaOH$ ratio was 0.500. The nitrogen gasification was then switched off and gasification was carried out with 80 l/h of air via a gasification ring mounted underneath the stirrer. The gasification was terminated when an Fe(III) content of 67.3 mol % had been reached. Gasification with nitrogen was then repeated. Then 521 ml of sodium hydroxide solution containing 300 g/l, equivalent to 3.910 mol of NaOH, were fed in by pumping in the course of 4 minutes. At this point in time, the $FeSO_4/NaOH$ ratio was 0.46. Then 1187 ml of $FeSO_4$ solution having a content of 250.13 g/l was fed in by pumping in the course of 5 minutes. This amount of $FeSO_4$ is equivalent to 1.955 mol of $FeSO_4$. The $FeSO_4/NaOH$ ratio at this point in time was 0.500. Then oxidation was carried out with 80 l/h up to an Fe(III) content of 66.8 mol %.

After completion of this reaction, the suspension was filtered, washed thoroughly with fully demineralized water and dried at 80° C. in air. The powder obtained was ground in an impact crusher.

The magnetite obtained had the following properties:

| | |
|---|---|
| Brightness L* | 51.7 |
| a* | 0.3 |
| b* | −4.6 |
| BET surface area | 5.6 m$^2$/g |
| Sphericity | 0.92 |

-continued

| | |
|---|---|
| Si content | <0.001% |
| Coercive force | 52 oersted = 4.138 kA/m |
| Particle size | 0.2 μm |
| S content | 1.03% SO$_3$ |
| Mn content | 0.12% |
| Water-soluble components | 0.09% |
| DIN pH value | 5.6 |
| Fe content | 70.3% |
| Thermal stability | 140° C. |

Comparison Example 6000 g of sodium hydroxide solution containing 300 g/l, equivalent to 45 mol, of NaOH, were introduced into a stirred vessel having a capacity of 30 l. After switching on the nitrogen gasification and the stirrer, the sodium hydroxide solution was heated to 90° C. 13.664 l of iron(II) sulfate solution having a content of 250.13 g/l, equivalent to 22.50 mol of Fe(II), were now fed in by pumping in the course of 43 minutes. The FeSO$_4$/NaOH ratio was 0.500. The nitrogen gasification was then switched off and gasification was carried out with 80 l/h of air via a gasification ring mounted underneath the stirrer. The gasification was terminated after an Fe(III) content of 67.3 mol % had been reached. After completion of this reaction, the suspension was filtered, washed thoroughly with fully demineralized water and dried at 80° C. in air. The powder obtained was ground in an impact crusher.

The magnetite obtained had the following properties:

| | |
|---|---|
| Brightness L* | 53.8 |
| a* | 0.4 |
| b* | −4.1 |
| BET surface area | 7.2 m$^2$/g |

-continued

| | |
|---|---|
| Sphericity | 0.90 |
| Si content | <0.001% |
| Coercive force | 57 oersted = 4.535 kA/m |
| Particle size | 0.2 μm |
| S content | 1.08% SO$_3$ |
| Mn content | 0.12% |
| Water-soluble components | 0.09% |
| DIN pH value | 5.6 |
| Fe content | 70.3% |
| Thermal stability | 110° C. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A toner comprising low-silicon magnetites, wherein the low-silicon magnetites have a silicon content of less than 0.025 wt % based on the weight of the magnetite and wherein the magnetites have a brightness L* of from 50.0 to 60.00 CIELAB, a color tinge a* of −0.5 to 1.5 CIELAB, a color tinge b* of −3.0 to −7.0 CIELAB, a sphericity of 0.80 to 1.0.

a coercive force of 30 to 70 oersted, a particle size of 0.1 to 1.0 μm, a sulfur content of 0.05 to 1.1 wt %, determined as SO3.

a manganese content of 0.05 to 0.5 wt %, a content of water-soluble components of less than 0.2 wt % and a pH of 4.0 to 8.5.

* * * * *